Patented Dec. 8, 1936

2,063,143

UNITED STATES PATENT OFFICE 2,063,143

PRODUCT FOR AND METHOD OF JELLY PREPARATION

Willard E. Baier, Ontario, Calif., assignor to California Fruit Growers Exchange, Los Angeles, Calif., a corporation of California No Drawing. Application November 12, 1929, Serial No. 406,720

35 Claims. (Cl. 99—132)

This invention relates to methods of preparing jellies, jams and marmalades, and more particularly provides means whereby the preparation of a jam, jelly or marmalade may be quickly and easily effected, with a certainty of satisfactory results heretofore impossible except by the exercise of a very high degree of skill and by a most rigid control of the various factors that govern the formation of a jelly of desired characteristics.

A jelly may be formed by bringing a jelly-forming agent to a suitable concentration in the presence of proper concentrations of other desired or necessary ingredients. Pectin, for example, will form a jelly when present with suitable quantities of sugar, water and acid. This is perhaps the simplest form of a pectin jelly, although numerous variations are possible, such as, for example, the addition of coloring or flavoring, the use of a fruit juice material, or other suitable material, in place of part or all of the water and/or the acid, the replacement of the water by wine or the like, and the use of some other suitable material to replace all or part of the sugar.

However, in simplest terms, the necessary ingredients for a pectin jelly are pectin, water, sugar and acid.

In the preparation of a jelly of desired characteristics, the proportion of the various ingredients must be carefully controlled. Furthermore, since the formation of a jelly commences as soon as all the ingredients are present in proper proportions, the whole process requires very careful and rigid control. Satisfactory control can usually be effected in large commercial establishments where skillful and specially trained workers are employed. However, when such highly skilled workers are not available as in small establishments or where the housewife desires to make small quantities of jelly from time to time at home, close control is out of the question and the results are frequently inferior or entirely unsatisfactory.

Numerous attempts have been made to supply the jelly maker and the housewife with a pectin preparation that could be used with comparative ease and with consistently satisfactory results. Preparations made in the hope of filling this need are now available commercially either in liquid or in solid form, but these preparations are not entirely satisfactory commercially, either by reason of their great bulk or the unsatisfactory results obtained, or both.

Obviously, from the standpoint of bulk, a dry preparation is decidedly preferable to a liquid one, for liquid pectin preparations are usually made of such strength as to jell only about five times their weight of sugar, whereas a commercial dry preparation can easily be made to jell upwards of twenty-five times its weight of sugar.

In the preparation of a dry pectin product to be used by the housewife for making jellies, it is usually considered necessary to include with the pectin the amount of an acid necessary to cause the formation of the jelly. These two ingredients are present in the commercial package in definite amounts. The housewife is then instructed to employ certain amounts of sugar and water. Since the sugar and water are present in comparatively large proportions, the chance for a large percentage error is therefore correspondingly smaller. A certain amount of dextrin, sugar, or other suitable material is usually also included in the package, in order to standardize the pectin, that is, to control the jelly strength or grade of the pectin.

The inclusion of acid with the pectin in preparing a packaged product has several serious drawbacks. Prominent among these may be mentioned the fact that when the pectin-acid mixture is stored for any length of time quite a noticeable degradation of the pectin may occur, that is, the jellifying power of the pectin may be decreased, especially whenever any moisture has had access to the material. Consequently, when the material is employed by the housewife, or is otherwise utilized in the preparation of a jelly, an inferior or even wholly unsatisfactory product is obtained.

Another serious disadvantage of the pectin-acid mixture arises in the use of the material. In using a material of this sort, the pectin-acid mixture is usually dispersed in the water, or fruit juice, or the like, then the sugar is added and the mix raised to a sufficiently high temperature for a sufficient time to effect sterilization and complete solution, after which the mix is skimmed and poured into containers.

A very serious disadvantage in the use of a prepared pectin-acid product, is the fact that after the pectin-acid material has been dispersed in the aqueous material, as soon as the sugar has been added and dissolves, the formation of a jelly commences. In the case of some pectins which, due to the maner of their preparation, are inherently quick setting, the length of time within which the batch will set to a jelly is only a matter of seconds. This allows altogether insufficient time for manipulation of the batch, including skimming and pouring, and as a consequence the jelly is frequently poured when already partially set, and is lumpy and of poor appearance and texture. Again, even before all of the sugar has gone into solution completely, the sugar will, in many places throughout the mix, momentarily reach a concentration sufficient for jellification, and in such places a certain amount of jellification takes place before the whole mix can be brought to complete solution. This results in the batch being thickly interpersed with flocs or flakes of prematurely formed jelly and the final product thereby acquires a decidedly inferior appearance and a weak, grainy and quite unsatisfactory texture.

I have now discovered that it is possible to eliminate the foregoing and other disadvantages from dry pectin preparations, and at the same time render it unnecessary for the user of the preparation to employ any additional acidulating material. In my preferred embodiment, I accomplish this by the addition to the pectin during the preparation of the packaged product of relatively neutral and relatively inert homogeneous material which acts to form acidulating material in the jelly patch at the proper time in the preparation thereof.

An object of this invention is to disclose and provide a product for use in the manufacture of jellies, jams and marmalades which will liberate an edible acidulant in the jelly batch after the product has been dissolved therein, a proper quantity of sugar added and the mixture heated.

Another object of this invention is to provide a pectin preparation which will not deteriorate during storage.

Another object is to disclose and provide a pectin preparation that will have no tendency to pre-jellification in the jelly batch.

Another object is to disclose and provide a pectin preparation that is substantially neutral and inert during storage.

A still further object is to disclose and provide a pectin preparation which, when dissolved in a jelly batch, will not liberate an acidulant until the batch has been heated to place the sugar in solution.

A further object is to disclose and provide a pectin preparation containing a material capable of reacting so as to form and liberate an acidulant in an aqueous solution.

Another object is to disclose and provide a method of producing pectin jellies of optimal characteristics without exercising extraordinary care and control.

A still further object is to disclose and provide a method of preparing jellies whereby granular or weak texture jellies will not be produced.

Another object is to disclose and provide a method of preparing jellies in which an acidulant is liberated after all of the other ingredients essential to the preparation of a jelly are in proper form.

Other objects, uses and advantages of this invention will become apparent to those skilled in the art from the following detailed description of the invention, the products employed and the mode of operation.

In carrying out my invention, I employ any satisfactory pectin, suitably standardized, if desired. With the pectin I mix or otherwise incorporate a suitable amount of homogeneous material capable of acting to form acidulating material. The amount of this latter material added is to be carefully regulated with regard to the pH desired in the final jelly. Ordinarily the limits of pH for formation of satisfactory jelly are regarded as being about pH 2.0 to pH 3.4, with the optimum range pH 2.6 to pH 3.1. Accordingly, I so regulate the ingredients that the pH of the jelly shall lie within the desired range.

Several factors must be taken into account, in the selection of a material to act as an acidulating medium, while other factors are also important. Among the factors that should be regarded may be mentioned the following: Rate of hydrolysis (where hydrolysis occurs), strength of acidulating material formed, melting points and boiling points of the materials employed and formed, taste, odor, appearance, cost, hygroscopicity, and toxicity. When hydrolysis is depended on for the formation of the acidulating material, such hydrolysis should occur in the presence of heat, or water, or both within approximately the time necessary to prepare the jelly batch and place it in containers. Hydrolysis should not, however, occur so rapidly as to result in immediate formation of the acidulating material. The strength of the acidulant formed is of importance with regard to the pH of the jelly formed and with regard to the amount of original material to be included with the pectin during preparation.

Since the material is to be employed in a dry preparation and since jelly batches are ordinarily heated sufficiently to effect sterilization and complete solution, melting points and boiling points are of importance. Obviously a material liquid at ordinary temperatures could be employed in connection with some suitable absorbent, such as dextrin or sugar. If sufficiently inert it might even be absorbed in the pectin. The taste, odor and appearance of the original and the final materials are of obvious importance. The hygroscopicity of the material employed is of importance, since the production of a dry preparation is contemplated, and it must be taken into consideration in this connection and also with a view to the effect upon packaging costs. The materials employed and formed must of course be non-toxic to human beings in the proportions employed.

Desirable acidulating materials are such as will act to form edible acid materials, with the possible additional formation of some other unobjectionable product. Among the classes of materials which satisfy the necessary requirements may be mentioned acid anhydrides; acid chlorides, particularly those of high molecular weight; esters, including cyclic double esters of hydroxy acids; and compounds and mixtures that will react in the jelly batch to liberate or produce an acid material. By the term "anhydrides", I mean those compounds capable of forming an acid by uniting with water, or being formed from an acid by the extraction of water. It should be noted that, in this sense, acid anhydrides, esters, and cyclic double esters of hydroxy acids may be regarded as belonging to the same class of materials, since each is prepared by the dehydration of acid.

Among the acid anhydrides whose acids are suitable for the manufacture or preparation of jellies may be mentioned the following: Acetic, propionic, maleic, methylene citric, succinic, adipic, and glutaric. Diglycollic anhydride should also be mentioned.

Among acid chlorides of high molecular weight, may be mentioned those of fatty acids of the acetyl type and substituted fatty acids such as, for example, phenylacetyl chloride; and those of aromatic acids of the benzoyl type and substituted aryl acids such as, for example, toluoyl chloride.

Among the esters whose acids are suitable for use in jellies may be mentioned methyl lactate and ethyl lactate, the ethyl and methyl esters of tartaric and citric acids, including diethyl and dimethyl tartrate and dimethyl and trimethyl citrate; and substituted malonates of the general type

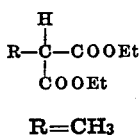

Where
$$R=CH_3$$

the ester is known as diethylisosuccinate. Esters of the general type of monoformin should also be included. Among the cyclic double esters of hydroxy acids may be mentioned lactide and glycollide, or polyglycollide. The acids, lactic and glycollic, are well suited for use in jellies.

Among other compounds which will react in the jelly batch to liberate an acidulant, may be mentioned compounds of the type of glycerotriphosphoric acid ($C_3H_5PO_4$), alkaline salts similar to the calcium hydrogen phosphates, and alkali salts of acids of the type of chloracetic acid.

Potassium chloracetate, for example, yields potassium chloride, which is harmless and has no deleterious effect upon any of the characteristics of the jelly, and glycollic acid which, as mentioned above, is well suited for jelly making.

From a contemplation of the above disclosures, it will be evident that in carrying out my invention I may avail myself of a comparatively wide field of choice in the selection of the particular acidulant-forming material to be employed. The choice of the specific agent will at all times be controlled by the various governing factors set forth previously. It will, furthermore, be obvious that the particular material I prefer to employ may change from time to time, due to variations in the different factors, such as, for example, the cost of the material. It may also prove of advantage to use different acidulant-formers with pectins from different sources, or pectins extracted by different means, or with pectins of different jelly grades. All such changes and variations, together with any other obvious ones, are contemplated as being within the scope of this invention.

Although all of the specific materials mentioned above are suitable for the purposes of this invention, I have found that those materials which will act in the jelly batch to yield edible hydroxy organic acids are most suitable, and of these I particularly prefer to employ those compounds which will yield edible monobasic alpha-hydroxy organic acids.

It is to be understood that where I refer to general classes of materials, I do not intend to include materials which do not suitably lie within the choice of the material as previously set forth herein. By the term "homogeneous" as used herein and in the claims reference is made to a substance capable of slowly liberating an acid, said substance being of the same kind or nature throughout each individual particle thereof, as contrasted with a substance whose particles are provided with a coating.

The quantities and proportions of materials employed will vary with the character of the material used. For example, obviously different proportions would be necessary using a material yielding glycollic acid or if using a material yielding citric acid. The difference in proportions is caused by the difference in molecular weights of the various materials and of the two acids, and because of the difference in the activity of these two acids. However, any person skilled in the art could readily determine the amount of a particular acidulant necessary to bring a jelly batch having, say, 65% sugar and a pectin of a definite jelly grade to the desired acidity or pH for jellification.

Thus it will be seen that I have provided means whereby the making of jelly is greatly simplified, and means which permits all the necessary ingredients for the preparation of a jelly to be packaged together without any danger of deterioration. I have also eliminated the tendency toward presetting and flocculation. In the use of my new pectin preparation it is simply dispersed in the indicated or desired amount of water and/or fruit juice, and the necessary or desired amount of sugar added.

The acidulating material included in the pectin preparation preferably does not liberate its acid or acidulant as long as the aqueous solution in which it is dispersed is cold. The mixture of the pectin preparation, water and sugar is then heated to a temperature above about 120° F. or boiled, thereby liberating the acidulant and thus bringing the batch to the proper pH. The batch may then be skimmed and placed in containers.

It is, of course, not necessary in all cases to prolong the heating sufficiently to completely liberate the acidulant. Where convenient, this reaction may be allowed to go to completion in the hot jelly material, after said material has been placed in the containers.

Obviously, moreover, presetting and flocculation will not occur in the use of my invention, since the sugar particles and the pectin will be in solution before the acidulant is liberated sufficiently to raise the acidity to a point inducing jellification.

While I have described my invention as particularly adapted to use by the housewife, it obviously has equal, if not greater, advantages for use by the commercial jelly maker. Furthermore, although the invention and its mode of operation has been specifically described, it is to be understood that numerous changes and modifications may be made without departing from the spirit thereof, and all such changes and modifications as come within the appended claims are embraced thereby.

I claim:

1. A substantially dry pectin preparation containing pectin and, in addition to the pectin a substantially neutral and substantially inert homogeneous substance capable of yielding, when heated in a jelly batch, an edible organic acid.

2. A substantially dry pectin preparation comprising pectin, a standardizing material and in addition a relatively neutral and inert homogeneous substance capable of yielding, when heated in a jelly batch, an edible acidulant.

3. An improvement in the art of producing pectin jelly, comprising mixing all of the ingredients of a pectin jelly with water so as to produce a mixture having an active acidity insufficient to cause jellification, and then increasing the active acidity, during the process of manufacture, by hydrolysis of some of the components of the mixture so as to permit the production of a satisfactory jelly.

4. The method of making jelly which comprises dispersing in a suitable aqueous medium a mixture containing pectin, a standardizing material and in addition a relatively neutral and inert homogeneous substance capable of yielding, when heated in a jelly batch, an edible acidulant; adding sugar to the aqueous medium and then heating the mixture to effectively liberate said edible acidulant.

5. A pectin preparation containing pectin and in addition separate discrete particles of a homogeneous, substantially neutral substance which, upon expiration of an appreciable time after the dispersion of the pectin preparation in an aqueous medium, becomes available to acidify the aqueous dispersion and solution.

6. A method of jelly making which comprises adding to an aqueous medium a product containing pectin and in addition separate discrete particles of a relatively neutral and inert homogeneous substance capable of liberating an edible acidulant in the presence of heat and water, and then applying heat in quantity sufficient to liberate said edible acidulant.

7. A substantially dry product for use in the manufacture of jams, jellies and marmalades comprising pectin and in addition particles of homogeneous substantially neutral and inert substance capable of liberating an edible acidulant when said material is dissolved and heated in an aqueous solution.

8. A substantially dry product for use in the manufacture of jams, jellies and marmalades comprising pectin and in addition particles of a finely divided substantially neutral and inert homogeneous substance incapable of rapidly hydrolizing in cold aqueous solution but capable of liberating an edible acidulant when said material is dissolved in an aqueous solution and said solution is heated to above 120° F.

9. A substantially dry product for use in the manufacture of jams, jellies and marmalades comprising pectin and in addition a material incapable of rapidly hydrolizing in cold aqueous solution but capable of liberating by hydrolysis an edible acidulant when said material is dissolved in an aqueous solution and said solution is heated to above 120° F.

10. The method of jelly making which comprises adding to an aqueous medium a mixture containing pectin and an acid anhydride capable of yielding an edible acidulant in the presence of heat and water, adding sugar to the aqueous medium, and applying heat in quantities sufficient to liberate said edible acidulant.

11. A product containing pectin and an acid anhydride, said acid anhydride being capable of yielding an edible acidulant when said preparation is dissolved in an aqueous solution, said acidulant being liberated in quantities sufficient to impart a pH of between 2.0 and 3.4 to the aqueous solution.

12. A substantially dry pectin preparation containing pectin in finely divided form and an acid anhydride capable of forming and liberating an edible acid by uniting with water in the presence of heat.

13. A substantially dry pectin preparation containing pectin and an organic acid anhydride capable of forming an edible acid by uniting with water.

14. A substantially dry pectin preparation containing purified pectin in finely divided form and an organic acid anhydride capable of forming and liberating an edible acid by uniting with water in the presence of heat.

15. The process which comprises, dissolving in water pectin and an acid anhydride, and heating the solution to cause increase of the hydrogen ion concentration of the solution.

16. A dry composition soluble in water at ordinary temperature for making jelly, comprising pectin and an acidulating proportion of an anhydride of a dicarboxylic acid which anhydride permits solution of the pectin in water at ordinary temperature, and at elevated temperature causes increase of the hydrogen ion concentration of the solution to acidulate the pectin.

17. A dry composition soluble in water at ordinary temperature for making jelly, comprising sweetening sugar, pectin and an acidulating proportion of an anhydride of a dicarboxylic acid, which anhydride permits solution of the pectin in water at ordinary temperature, and at elevated temperature causes increase of the hydrogen ion concentration of the solution to acidulate the pectin.

18. The process of acidifying pectin comprising dissolving in water at ordinary temperature pectin and an acidulating proportion of an anhydride of a dicarboxylic acid which permits solution of the pectin in water at ordinary temperature, and heating the solution at elevated temperature to cause increase of the hydrogen ion concentration of the solution to acidulate the pectin.

19. The process of acidifying pectin comprising dissolving in water at ordinary temperature pectin and an acidulating proportion of an anhydride having a structural formula $$\begin{array}{c} CH_2-CO \\ | \quad\quad\quad \diagdown \\ \quad\quad\quad\quad\quad O \\ | \quad\quad\quad \diagup \\ CH_2-CO \end{array}$$

which permits solution of the pectin in water at ordinary temperature, and heating the solution at elevated temperature to cause increase of the hydrogen ion concentration of the solution to acidulate the pectin.

20. A substantially dry pectin preparation containing pectin and succinic anhydride.

21. A dry composition soluble in water at ordinary temperature for making jelly, comprising pectin and an acidulating proportion of a derivative of a dicarboxylic acid, which derivative permits solution of the pectin in water at ordinary temperature, and at elevated temperature causes increase of the hydrogen ion concentration of the solution to acidulate the pectin.

22. A dry composition soluble in water at ordinary temperature for making jelly, comprising sweetening sugar, pectin and an acidulating proportion of a derivative of a dicarboxylic acid, which derivative permits solution of the pectin in water at ordinary temperature, and at elevated temperature causes increase of the hydrogen ion concentration of the solution to acidulate the pectin.

23. The process of acidifying pectin comprising dissolving in water at ordinary temperature pectin and an acidulating proportion of a derivative of a dicarboxylic acid which permits solution of the pectin in water at ordinary temperature, and heating the solution at elevated temperature to cause increase of the hydrogen ion concentration of the solution to acidulate the pectin.

24. A dry composition soluble in water at ordinary temperature for making jelly, comprising pectin and an acidulating proportion of an ester of a dicarboxylic acid, which ester permits solution of the pectin in water at ordinary temperature, and at elevate temperature causes increase of the hydrogen ion concentration of the solution to acidulate the pectin.

25. A dry composition soluble in water at ordinary temperature for making jelly, comprising sweetening sugar, pectin and an acidulating proportion of an ester of a dicarboxylic acid, which ester permits solution of the pectin in water at ordinary temperature, and at elevated temperature causes increase of the hydrogen ion concentration of the solution to acidulate the pectin.

26. The process of acidifying pectin comprising dissolving in water at ordinary temperature pectin and an acidulating proportion of an ester of a dicarboxylic acid which permits solution of the pectin in water at ordinary temperature to cause increase of the hydrogen ion concentration of the solution to acidulate the pectin.

27. A dry composition soluble in water at ordinary temperature for making jelly, comprising pectin and an acidulating proportion of a derivative of an hydroxy organic acid, which derivative permits solution of the pectin in water at ordinary temperature and at elevated temperature causes increase of the hydrogen ion concentration of the solution to acidulate the pectin.

28. A dry composition soluble in water at ordinary temperature for making jelly, comprising sweetening sugar, pectin and an acidulating proportion of a derivative of an hydroxy organic acid, which derivative permits solution of the pectin in water at ordinary temperature, and at elevated temperature causes increase of the hydrogen ion concentration of the solution to acidulate the pectin.

29. The process of acidifying pectin comprising dissolving in water at ordinary temperature pectin and an acidulating proportion of a derivative of an hydroxy organic acid which permits solution of the pectin in water at ordinary temperature, and heating the solution at elevated temperature to cause increase of the hydrogen ion concentration of the solution to acidulate the pectin.

30. A dry composition soluble in water at ordinary temperature for making jelly, comprising pectin and an acidulating proportion of an ester of an hydroxy organic acid, which ester permits solution of the pectin in water at ordinary temperature, and at elevated temperature causes increase of the hydrogen ion concentration of the solution to acidulate the pectin.

31. A dry composition soluble in water at ordinary temperature for making jelly, comprising sweetening sugar, pectin and an acidulating proportion of an ester of an hydroxy organic acid, which ester permits solution of the pectin in water at ordinary temperature, and at elevated temperature causes increase of the hydrogen ion concentration of the solution to acidulate the pectin.

32. The process of acidifying pectin comprising dissolving in water at ordinary temperature pectin and an acidulating proportion of an ester of an hydroxy organic acid which permits solution of the pectin in water at ordinary temperature to cause increase of the hydrogen ion concentration of the solution to acidulate the pectin.

33. A pectin preparation containing pectin and a cyclic double ester of hydroxy acid capable, upon dispersion of the pectin preparation in an aqueous medium, of slowly becoming available to acidify the aqueous dispersion and solution.

34. A substantially dry pectin preparation containing pectin and a lactide.

35. The process of acidifying pectin comprising dissolving in water at ordinary temperature pectin and an acidulating proportion of an inner anhydride having a structural formula

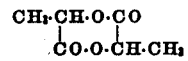

which permits solution of the pectin in water at ordinary temperature, and heating the solution at elevated temperature to cause increase of the hydrogen ion concentration of the solution to acidulate the pectin.

WILLARD E. BAIER.